O. O. SKRUKRUD.
COUNTERSINK.
APPLICATION FILED AUG. 26, 1916.
1,267,704.
Patented May 28, 1918.
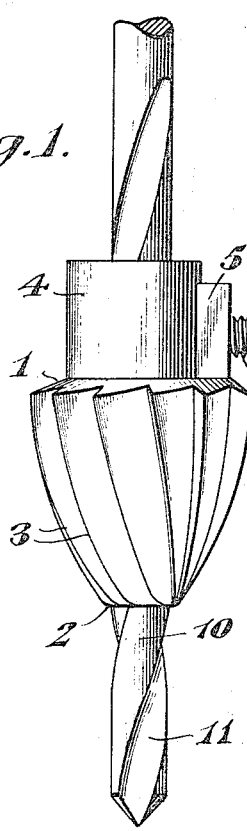
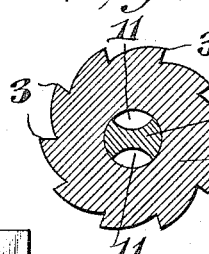
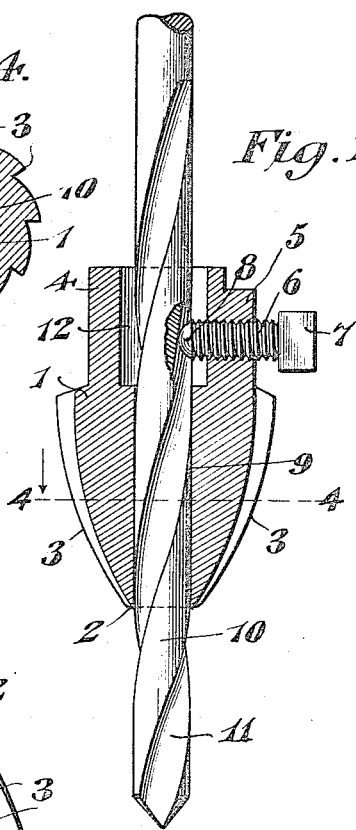
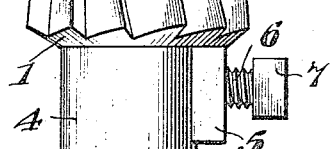
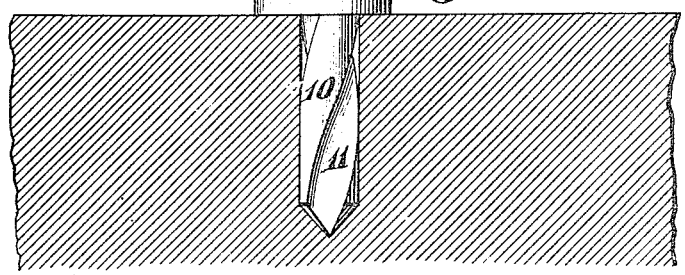
WITNESSES
INVENTOR
Olaf O. Skrukrud,
BY
ATTORNEY

UNITED STATES PATENT OFFICE.

OLAF O. SKRUKRUD, OF LANESBORO, MINNESOTA.

COUNTERSINK.

1,267,704.

Specification of Letters Patent.   Patented May 28, 1918.

Application filed August 26, 1916. Serial No. 117,000.

*To all whom it may concern:*

Be it known that I, OLAF O. SKRUKRUD, a citizen of the United States, residing at Lanesboro, in the county of Fillmore and State of Minnesota, have invented new and useful Countersinks, of which the following is a specification.

This invention has reference to countersinks, and its object is to provide a countersink attachable to a drill or other boring tool, which countersink will produce a smooth kerf, free from frayed edges.

In accordance with the present invention there is provided a countersink in the form of a block of conoidal shape with cutting teeth having a pitch opposite to that of the flutes of the drill or other boring tool—that is to say, the trend of said teeth being retrogressive from the larger end to the smaller end with respect to the direction of active rotation of the countersink—so that the countersink teeth force the wood fibers, considering wood as the material being bored, in the direction of travel of the countersink into the wood, this resulting in a smooth edge at the countersunk hole, instead of a more or less frayed edge often produced by the ordinary cutting tools due to the forcing of the cuttings or kerf in a direction opposite to that of the travel of the tool into the wood and the intervening grooves between the teeth opening through the upper face of said countersink to prevent choking of the same and permitting the free passage of the cuttings from the countersunk.

The invention will be best understood from a consideration of the following detailed description, taken in connection with the accompanying drawing, forming part of this specification, with the further understanding that while the drawing shows a practical form of the invention, the latter is not confined to strict conformity with the showing of the drawing, but may be changed and modified, so long as such changes and modifications come within the scope of the appended claims.

In the drawing:—

Figure 1 is an elevation of the countersink applied to a twist drill.

Fig. 2 is a longitudinal diametric section of the countersink applied to a twist drill with the latter shown in elevation.

Fig. 3 is an elevation of the countersink applied to a twist drill, but related to the latter to serve as a depth gage.

Fig. 4 is a section on the line 4—4 of Fig. 2.

Referring to the drawing, there is shown a block 1 constituting the body portion of the countersink, the block being of conical shape, with a flattened apex 2, while the surface of the conical block is formed into a circumferential series of cutting teeth or edges 3, having a pitch circumferential of the block and retrogressing from the large end of the block toward the smaller or flattened end 2, such retrogression being with respect to the direction of rotation of the countersink when in operation.

Proceeding from the larger end of the block 1 is an axially extended neck 4 having a thickened offset 5 on one side provided with a screw-threaded hole for the passage of a set screw 6 having a head 7 at one end and an engaging end 8 at the other end.

Extending axially through the body 1 of the block is a passage 9 for a drill 10, shown in the drawings as an ordinary twist drill of the kind employed in metal boring, but it will be understood that other types of drills or boring tools for either wood or metal may be used. A twist drill has helically disposed grooves or flutes 11 therealong having a progressive pitch along the drill from the butt end of the latter toward the drill point, the direction of pitch being forward or progressing, while that of the teeth 3 of the countersink is backward or retrogressive with respect to the direction of rotation of the drill and countersink carried thereby.

The neck 4 has an axial passage 12 therethrough in alinement with the passage 9 and of larger diameter, so that the passage 12 may be considered as a counterbore with respect to the passage 9. Each tooth 3 comprises solely two surfaces outwardly converging to form a knife edge extending from the smaller to the larger end of the body, and the intervening grooves of the teeth open through the upper face of the block, so that in the working of the countersink the cuttings from the countersunk formed thereby will have free passage through the grooves from the countersunk irrespective of the depth of cutting action of the block, thereby preventing the choking of the countersink with the resultant smooth formation of said countersunk and without the dulling of the cutting edges of the teeth.

When the device is employed as a countersink, it is fixed upon the drill 10 to an appropriate distance from the active end of the drill, so that a hole may be bored by the latter and when the desired depth is reached the countersink becomes active in the usual manner to enlarge the entering end of the bored hole and shape it in a manner permitting it to seat a head or other enlargement upon the device to be introduced into the bored hole. Usually, the countersink is employed to enlarge the entering end of the hole in a manner to receive a screw head and hence the countersink is usually shaped for such a purpose. The countersink is held upon the drill 10 by the set screw 6, the engaging end 8 of which may enter one of the flutes 11 close to the point where the drill emerges from the passage 9 into counterbore 12.

There are forms of drills designed to enter adapters which in turn are held in a suitable chuck provided in certain types of tools designed for boring and other like work. The countersink 12 is provided for the reception of such an adapter, so that the countersink is available for use not only with straight-shank or other twist drills, but may be used with the type of tools referred to where adapters are employed to hold the drill to the tool.

To use the countersink as a depth gage, it is reversed in position on the drill, so that the neck 4 is toward the active end of the drill, with the free end of the neck toward the active end of the drill and at a distance therefrom corresponding to the depth to which it is desired the drill shall enter the work. This arrangement, which is shown in Fig. 3, determines the depth to which the drill is permitted to enter the work, further progress being stopped by the engagement of the free end of the neck 4 with the work.

Considering the drill as working in wood, the cuttings of the drill are directed by the helical flutes 11 toward the entering end of the hole being bored and tend to lift the grain of the wood toward such entering end of the hole, the result often being the production of more or less roughness at such entering end. The countersink 1, of course, obliterates any roughness which may have been produced at the entering end of the hole, but if the pitch of the teeth 3 was the same as the pitch of the flutes or grooves 11, or even if the teeth were parallel with the axis of rotation of the countersink, there would still be roughness produced at the outer or large end of the countersunk hole. With the present invention such roughness is obliterated, because the pitch of the teeth 3 is retrogressive and all cuttings are directed into the countersunk portion of the hole, while the trend of the teeth 3 is into the countersunk hole. The result is that the grain of the wood is forced inwardly with respect to the material being operated upon and all fraying of the edges is effectively prevented.

What is claimed is:—

A one-piece countersink, comprising a body portion or head of conoidal form centrally bored to receive a bit, and a circular series of angularly disposed teeth with a retrogressive pitch or trend from the larger end of the body portion toward the smaller end thereof with respect to the direction of active rotation of the countersink and conforming to the contour of the conoidal shape thereof, each tooth comprising solely two surfaces outwardly converging to form a knife edge extending from the smaller to the larger end of the body portion, with the intervening grooves opening through the upper face of said body portion.

In testimony, that I claim the foregoing as my own, I have hereto affixed my signature in the presence of two witnesses.

OLAF O. SKRUKRUD.

Witnesses:
H. L. QUANRUD,
S. KOOSE.